(12) United States Patent
Umetsu et al.

(10) Patent No.: US 7,959,470 B1
(45) Date of Patent: Jun. 14, 2011

(54) CONNECTOR WITH A CONNECTING MEMER WITH A SCREW PORTION PENETRATING THE INSULATORS AND TERMINALS OF TWO MATING TERMINAL HOUSINGS

(75) Inventors: Jun Umetsu, Hitachi (JP); Hideaki Takehara, Hitachi (JP); Kunihiro Fukuda, Tsukuba (JP); Sachio Suzuki, Hitachi (JP); Yuta Kataoka, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 12/857,964

(22) Filed: Aug. 17, 2010

(30) Foreign Application Priority Data

Dec. 18, 2009 (JP) ................................ 2009-287889

(51) Int. Cl.
*H01R 24/00* (2006.01)
(52) U.S. Cl. ........................................................ 439/626
(58) Field of Classification Search .................. 439/626, 439/627, 628, 752, 595, 746
See application file for complete search history.

(56) References Cited

U.S. PATENT DOCUMENTS

| | | | | |
|---|---|---|---|---|
| 3,504,100 A * | 3/1970 | Ohshima et al. | ............ | 174/88 B |
| 3,614,297 A * | 10/1971 | Carlson | ........................ | 174/88 B |
| 6,183,314 B1 * | 2/2001 | Wada et al. | .................... | 439/752 |
| 6,361,378 B1 * | 3/2002 | Konoya et al. | ................ | 439/752 |
| 6,568,948 B2 * | 5/2003 | Matsuoka | ..................... | 439/271 |
| 6,626,702 B2 * | 9/2003 | Kurimoto et al. | ............. | 439/595 |
| 6,896,560 B2 * | 5/2005 | Nakamura et al. | ............ | 439/752 |
| 7,204,726 B2 * | 4/2007 | Yamashita et al. | ............ | 439/752 |
| 7,572,150 B2 * | 8/2009 | Matsuoka | ..................... | 439/626 |
| 7,828,591 B2 * | 11/2010 | Matsuoka | ..................... | 439/559 |
| 2009/0075506 A1 | 3/2009 | Suzuki | | |

FOREIGN PATENT DOCUMENTS

| | | |
|---|---|---|
| JP | A-2004-056924 | 2/2004 |
| JP | B2-4037199 | 11/2007 |
| JP | A-2009-70754 | 4/2009 |

* cited by examiner

*Primary Examiner* — Chandrika Prasad
(74) *Attorney, Agent, or Firm* — Scully, Scott, Murphy & Presser PC

(57) ABSTRACT

A connector includes a first terminal housing with a plurality of first connecting terminals aligned and accommodated therein, a second terminal housing with a plurality of second connecting terminals aligned and accommodated therein, a plurality of insulation members aligned and accommodated in the first terminal housing, a connecting member including a head and a shaft connected to the head. The shaft and/or the head includes a first screw part to screw the connecting member into the first terminal housing and/or the second terminal housing. The shaft includes a second screw part to screw into an insulation member of the plurality of the insulation members at a forward end in an insertion direction of the connecting member. The second screw part includes a screw pitch greater than the first screw part.

4 Claims, 6 Drawing Sheets

| 5 FIRST TERMINAL HOUSING |
| 7 SECOND TERMINAL HOUSING |
| 9 CONNECTING MEMBER |

| 9 CONNECTING MEMBER |
| 9a SHAFT |
| 9b HEAD |
| 18 FIRST SCREW PART |
| 45 SECOND SCREW PART |

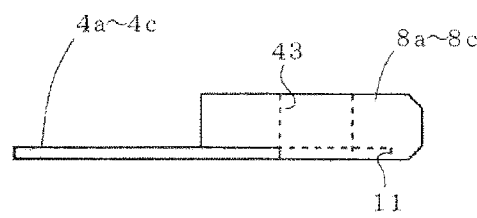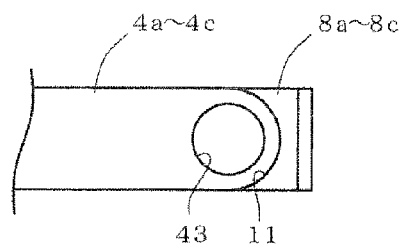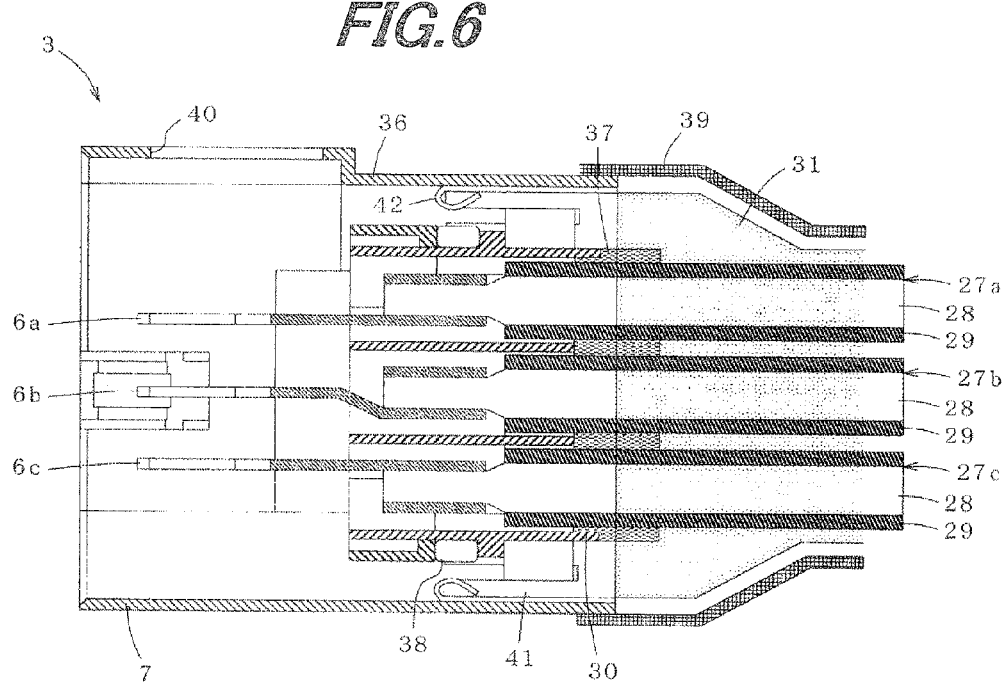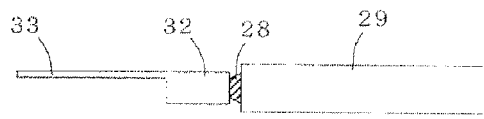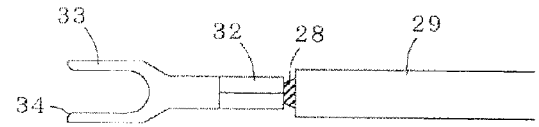

CONNECTOR WITH A CONNECTING MEMER WITH A SCREW PORTION PENETRATING THE INSULATORS AND TERMINALS OF TWO MATING TERMINAL HOUSINGS

The present application is based on Japanese patent application No. 2009-287889 field on Dec. 18, 2009, the entire contents of which are incorporated herein by reference.

BACKGROUND OF THE INVENTION

1. Field of the Invention

This invention relates to a connection structure, for use in eco-friendly cars, such as hybrid vehicles, electric vehicles and the like, and in particular, for being capable of use for a portion to connect a power harness, which is used for large power transmission.

2. Description of the Related Art

In hybrid vehicles, electric vehicles and the like which have remarkably developed in recent years, a power harness, which is used for large power transmission for connection between devices, has at its one end a connector, which consists of two separate portions: a male connector portion with a male terminal and a first terminal housing accommodating that male terminal, and a female connector portion with a female terminal connected with the male terminal and a second terminal housing accommodating that female terminal (See, e.g., JP-A-2009-70754)

In recent years, such eco-friendly cars have been designed to reduce the weights of all parts thereof, to enhance the energy saving performance of the cars. As one effective means to reduce the weights of parts of the cars, it has been proposed to reduce the sizes of the parts.

For example, a technique as described below, which has been disclosed by JP-B-4037199, is known in the art.

JP-B-4037199 discloses an electrical connection structure for a vehicle, which is for connecting multiphase connecting terminals of a conductive member drawn out from a motor for driving the vehicle, and multiphase connecting terminals of a power line cable drawn out from an inverter for driving the motor. The technique used in the electrical connection structure disclosed JP-B-4037199 is as follows: Each phase connecting terminal of the conductive member and each corresponding phase connecting terminal of the power line cable are overlapped, and isolating members are disposed on opposite surfaces to the overlapped surfaces of the connecting terminals, respectively, and these overlapped connecting terminals and isolating members are collectively fastened in an overlapping direction with a single bolt provided in a position to penetrate these overlapped connecting terminals and isolating members.

In other words, in the technique used in the electrical connection structure disclosed by JP-B-4037199, the single bolt is tightened in the overlapping direction (or stacking direction), to collectively hold the multiplicity of contacts between the connecting terminals, which are the overlapped surfaces of the connecting terminals, and thereby fix the connecting terminals at the contacts therebetween, for electrical connections between the connecting terminals, respectively. The construction disclosed by JP-B-4037199 is effective in easily ensuring size reduction, compared to a technique disclosed by JP-A-2009-070754.

SUMMARY OF THE INVENTION

However, the technique of JP-B-4037199 may have the following problem. Since a pace of fastening the bolt is synchronized with a pace of pressing the contacts (the contacts being pressed with strength corresponding to the fastening distance of the bolt), a predetermined fastening distance is needed to get a predetermined pressing force and thus may be an obstacle to the downsizing of the connector.

Thus, the inventors have contemplated a reduction in dimension in the overlapping direction (or the stacking direction) in order to further downsize the connector.

It is an object of the invention to provide a connector that includes a connection structure with plural first connecting terminals, plural second connecting terminals and plural insulation plates arranged in a stacked state, and a connecting member adapted to be forced in the stacking direction to collectively fix the plural first connecting terminals and the plural second connecting terminals at contacts for electrical connections therebetween, and that can be reduced in dimension in the stacking direction.

(1) According to one embodiment of the invention, a connector comprises:

a first terminal housing with a plurality of first connecting terminals aligned and accommodated therein;

a second terminal housing with a plurality of second connecting terminals aligned and accommodated therein;

a plurality of insulation members aligned and accommodated in the first terminal housing, wherein when the first terminal housing and the second terminal housing are fitted to each other, the plurality of first connecting terminals and the plurality of second connecting terminals face each other to form pairs, respectively, and a stacked state is exhibited such that pairs of the first connecting terminals and the second connecting terminals are alternately interleaved with the plurality of insulation members;

a connecting member comprising a head and a shaft connected to the head, the shaft penetrating contacts between the plurality of first connecting terminals and the plurality of second connecting terminals and the plurality of insulation members, the head pressing an adjacent insulation member, to thereby collectively fix the plurality of first connecting terminals and the plurality of second connecting terminals at the contacts for electrical connections therebetween, at least a portion of the connecting member, which penetrates the contacts, being comprised of a nonconductive material;

wherein the shaft and/or the head comprises a first screw part to screw the connecting member into the first terminal housing and/or the second terminal housing, the shaft comprises a second screw part to screw into an insulation member of the plurality of the insulation members at a forward end in an insertion direction of the connecting member, the second screw part comprising a screw pitch greater than the first screw part, and when the first terminal housing and the second terminal housing are fitted to each other and then tightened by the first screw part of the connecting member and the insulation member screwed into by the second screw part is tightened toward the head by the second screw part, the plurality of first connecting terminals and the plurality of the second connecting terminals are collectively fixed and electrically connected at the contact.

In the above embodiment (1) of the invention, the following modifications and changes can be made.

(i) The second screw part comprises a screw diameter greater than the first screw part.

(ii) The insulation member screwed into by the shaft is formed so as not to rotate around the shaft when the connecting member rotates, and the other insulation members except the insulation member screwed into by the shaft are each integrally fixed to the first connecting terminals adjacent thereto.

(iii) The connector further comprises:

an elastic member disposed between the head and the insulation member directly under the head.

POINTS OF THE INVENTION

According to one embodiment of the invention, a connector is constructed such that it includes a first screw part and a second screw part having a larger screw pitch than the first screw part and, when the first screw part is screwed into a threaded screw hole of a first terminal housing, a pressing force can be provided from two directions so as to sandwich each contact between a head (i.e., an elastic member for pressing the head) of a connecting member and a second insulation member. Therefore, even when the stroke distance is shorter than before, a pressing force sufficient to fix the contacts can be obtained. Thus, the stroke distance of the connecting member can be shortened and the dimension in the overlapping direction (i.e., in the stacking direction) can be thereby reduced, so that the connector can be further downsized.

BRIEF DESCRIPTION OF THE DRAWINGS

The preferred embodiments according to the invention will be explained below referring to the drawings, wherein:

FIG. 5A is a side view schematically showing a first connecting terminal;

FIG. 5B is a bottom view schematically showing a first connecting terminal;

FIG. 6 is a cross-sectional view schematically showing the second connector part;

FIG. 7A is a side view schematically showing a second connecting terminal;

FIG. 7B is a bottom view schematically showing a second connecting terminal;

DETAILED DESCRIPTION OF THE PREFERRED EMBODIMENTS

Figure 1:
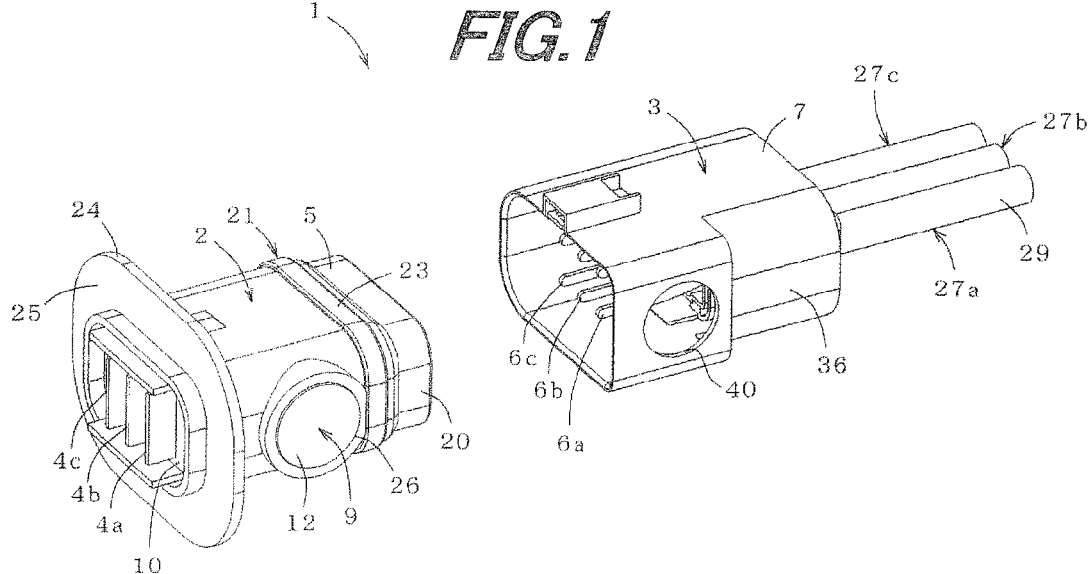
FIG. 1 is a perspective view schematically showing a first connector part and a second connector part that constitute a connector according to one embodiment of the invention.

The preferred embodiments according to the invention will be explained below referring to the drawings.

Figure 2:
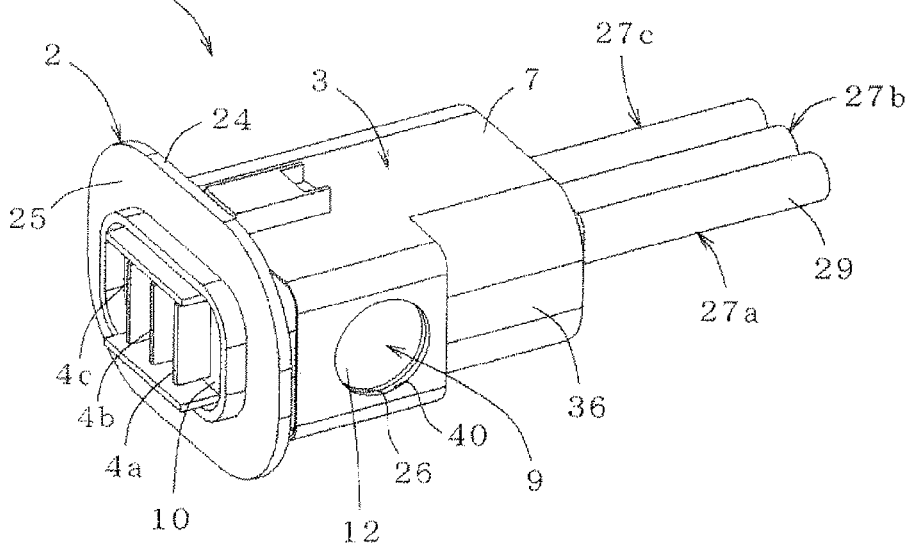
FIG. 2 is a perspective view schematically showing the connector after the first connector part and the second connector part are fitted to each other.
Figure 3:
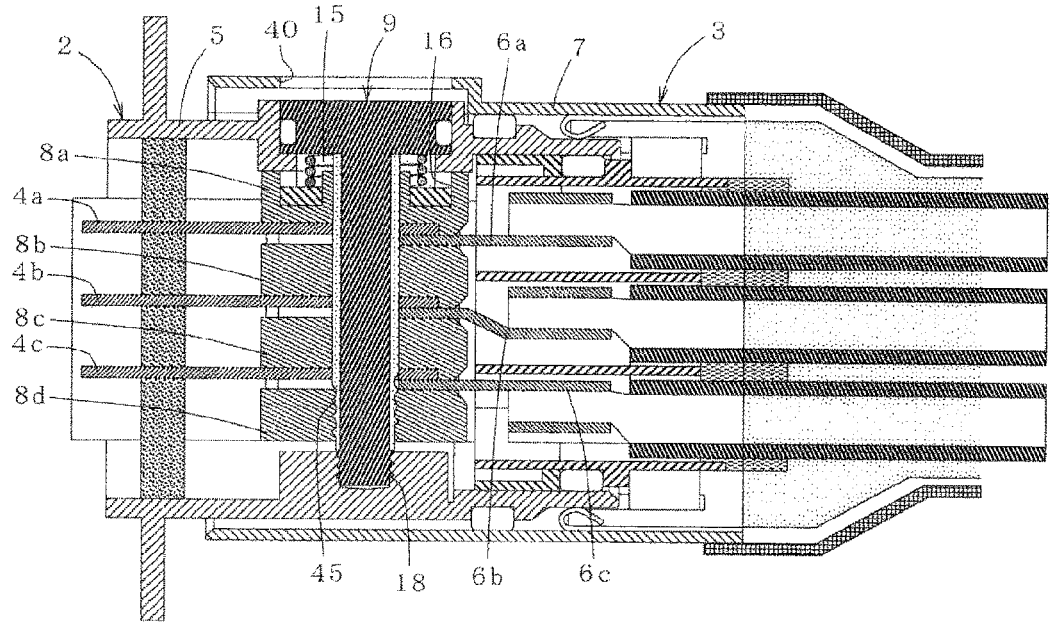
FIG. 3 is a cross-sectional view schematically showing the connector after the first connector part and the second connector part are fitted to each other.

FIG. 1 is a perspective view schematically showing a first connector part and a second connector part that constitute an connector according to one embodiment of the invention, FIG. 2 is a perspective view schematically showing the connector after the first connector part and the second connector part are fitted to each other, and FIG. 3 is a cross-sectional view schematically showing the connector after the first connector part and the second connector part are fitted to each other.

As shown in FIGS. 1 to 3, a connector 1 according to the embodiment includes a first connector part 2 and a second connector part 3 and is used for collectively connecting a plurality of power-supply lines by allowing the connector parts 2, 3 to be fitted to each other.

More particularly, the connector 1 includes the first connector part 2 having a first terminal housing 5 in which a plurality of (three) first connecting terminals (male terminals) 4a to 4c are housed in alignment with each other, the second connector part 3 having a second terminal housing 7 in which a plurality of (three) second connecting terminals (female terminals) 6a to 6c are housed in alignment with each other and a plurality of insulation members 8a to 8d housed in the first terminal housing 5 in alignment with each other, installed so as to sandwich each of a plurality of the first connecting terminals 4a to 4c, and used for insulating among the first connecting terminals 4a to 4c, and in the connector 1, when the first terminal housing 5 of the first connector part 2 and the second terminal housing 7 of the second connector part 3 are fitted to each other, each one surface of a plurality of the first connecting terminals 4a to 4c and each one surface of a plurality of the second connecting terminals 6a to 6c face each other so that they form a pair with each other (each pair of the first connecting terminal 4a and the second connecting terminal 6a, the first connecting terminal 4b and the second connecting terminal 6b, and the first connecting terminal 4c and the second connecting terminal 6c), and each of a plurality of the insulation members 8a to 8d is arranged so as to sandwich each of a plurality of the bonding terminal pairs comprising a plurality of the first connecting terminals 4a to 4c and a plurality of the second connecting terminals 6a to 6c that face each other, so that a stacked condition is formed.

The connector 1 is used for, for example, connection between a vehicle drive motor and an inverter which drives the motor.

More particularly, the first terminal housing 5 (FIG. 1 shows as a part located in a left side) of the first connector part 2 is fitted to a shield case of the motor, and a portion of the first connecting terminals 4a to 4c exposed from the first terminal housing 5 is connected to each terminal in a terminal block installed in the shield case of the motor. The second connector part 3 that electrically connects to the inverter is fitted to the first connector part 2, so that the motor and the inverter are connected to each other. In the above, a case of connection in the motor side has been explained, but a case of connection in the inverter side is similar to the case of the motor side.

Hereinafter, each composition of the first connector part 2 and the second connector part 3 will be explained in detail.

Figure 4:
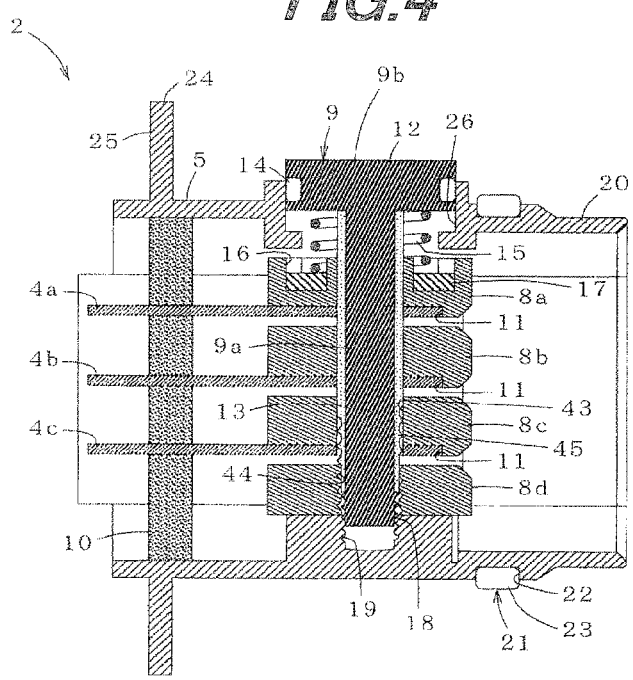
FIG. 4 is a cross-sectional view schematically showing the first connector part.

As shown in FIG. 4, the first connector part 2 internally holds three first connecting terminals 4a to 4c located apart at certain intervals in alignment with each other, and has the first terminal housing 5 in which three first connecting terminals 4a to 4c are housed in alignment with each other, a plurality of insulation members 8a to 8d having a nearly rectangular parallelepiped shape housed in the first terminal housing 5 in alignment with each other, and a connecting member 9 (a passing through type connecting member) that has a head 9b and a shaft 9a connected to the head 9b, collectively fixes and electrically connects a plurality of the first connecting terminals 4a to 4c and a plurality of the second connecting terminals 6a to 6c at each contact by allowing the shaft 9a to pass through each contact of a plurality of the first connecting terminals 4a to 4c and a plurality of the second connecting terminals 6a to 6c and a plurality of the insulation members 8a to 8d and pressing the insulation members 8a to 8d adjacent thereto by the head 9b and is formed of a nonconductive material at least in a part that passes through the respective contacts.

Further, the first terminal housing 5 can be any one of a male type one (a male side terminal housing) and a female type one (a female side terminal housing) as a terminal housing. Here, as an example, a case that the first terminal housing 5 is a male side terminal housing will be explained.

The first connecting terminals 4a to 4c are respectively a plate-like terminal, are formed of a nonconductive resin such as polyphenylene sulfide (PPS) resin, polyphthalamide (PPA) resin, polyamide (PA) resin, polybutylene terephthalate (PBT) resin, epoxy based resin, and are held in a resin compact 10 that is a part of the first terminal housing 5 so as to be located apart at certain intervals in alignment with each other. A method of allowing the resin compact 10 to hold the first connecting terminals 4a to 4c includes, for example, a method of inserting the first connecting terminals 4a to 4c into the resin at the time of molding the resin compact 10 and then hardening the resin so as to allow the resin compact 10 to hold the first connecting terminals 4a to 4c and a method of pressing the first connecting terminals 4a to 4c into the resin compact 10 that is preliminarily molded so as to allow the resin compact 10 to hold the first connecting terminals 4a to 4c.

In addition, each of the first connecting terminals 4a to 4c is integrally fixed to the insulation members 8a to 8c that is arranged in the other surface (a surface opposite to the surface to be bonded to the second connecting terminals 6a to 6c) side adjacently. Namely, as mentioned above, the resin compact 10 holds the first connecting terminals 4a to 4c so as to be located apart at certain intervals in alignment with each other, but the insulation members 8a to 8c are integrally fixed to forward end side of the respective first connecting terminals 4a to 4c, so that as a result, the insulation members 8a to 8c are also located apart at certain intervals in alignment with each other. Due to this composition, insulation properties among each contacts and insertion properties of the second connecting terminals 6a to 6c at the fitting can be ensured.

Electricity of different voltage and/or different current transmits to each of the first connecting terminals 4a to 4c. For example, in the embodiment, a power line of three-phase alternating current used for a connection between a motor and an inverter is assumed, and an alternating current having different phases by 120 degrees is transmitted to each of the first connecting terminals 4a to 4c. For the purpose of transmission loss reduction at the connector 1 and the like, it is preferable that each of the first connecting terminals 4a to 4c is formed of metal having high electric conductivity such as silver, copper, aluminum. In addition, each of the first connecting terminals 4a to 4c has a certain degree of flexibility.

A plurality of the insulation members 8a to 8d include a plurality of the first insulation members 8a to 8c housed in the first terminal housing 5 in alignment with each other and integrally fixed to each of the other surfaces (surfaces opposite to the surfaces to be bonded to the second connecting terminals 6a to 6c) of the first connecting terminals 4a to 4c, and the second insulation member 8d housed in the first terminal housing 5 and disposed so as to face the other surface (a surface opposite to the surface to be bonded to the first connecting terminal 4c) of the second connecting terminal 6c that locates at the outermost position when a plurality of the first connecting terminals 4a to 4c and a plurality of the second connecting terminal 6a to 6c are stacked.

A plurality of the insulation members 8a to 8d are fixed in such a position that they project from the forward ends of the first connecting terminals 4a to 4c. Each of the insulation members 8a to 8d are chamfered at each of the corners located at the side into (from) which the second connecting terminals 6a to 6c are inserted (removed). In addition, as shown in FIGS. 5A and 5B, fitting grooves 11 are formed in the first insulation member 8a to 8c, so as to be fitted by the first connecting terminals 4a to 4c as objects to be fixed. The first connecting terminals 4a to 4c as objects to be fixed are fitted and integrally fixed to the fitting grooves 11. Due to this, difference in level between the first insulation member 8a to 8c and the first connecting terminals 4a to 4c are eliminated, and a plurality of the lower surfaces (surfaces shown on the lower side in the drawings) of the first insulation members 8a to 8c become in flush with the lower surfaces (surfaces shown on the lower side in the drawings) of the first connecting terminals 4a to 4c. Due to these compositions, insertion and removal properties of the second connecting terminals 6a to 6c to the first connecting terminal 4a to 4c when the first connector part 2 and the second connector part 3 are fitted to each other can be enhanced. Further, in FIG. 5A, the first insulation member 8a is shown by simplifying the structure thereof and the first insulation members 8a to 8c are shown in the same fashion.

In each of the insulation members 8a to 8d, through holes 43 which the connecting member 9 passes through are formed, and in the through hole 43 of the insulation member 8d, a female screw 44 to which a second screw part 45 described below is screwed is tapped.

Once again, referring to FIG. 4, the connecting member 9 has a shaft 9a that passes through a plurality of the bonding terminal pairs including a plurality of the first connecting terminals 4a to 4c and a plurality of the second connecting terminals 6a to 6c that face each other and is formed so as to be nonconductive at least in a surface that contacts a plurality of the bonding terminal pairs, and a head 9b that is integrally formed with the shaft 9a as a pressing part.

More particularly, the connecting member 9 includes a bolt 12 made of metal such as SUS, iron, copper alloy (for example, a cap bolt) and an insulation layer 13 formed by that a periphery of the shaft 9a is coated with a nonconductive resin as a nonconductive material such as polyphenylene sulfide (PPS) resin, polyphthalamide (PPA) resin, polyamide (PA) resin, polybutylene terephthalate (PBT) resin, epoxy based resin. For example, a hexagon socket not shown is formed in the head 9b of the bolt 12, and a fastening tool such as an open-end wrench is fitted to the hexagon socket so that the bolt 12 can be rotated and fastened.

Further, as the connecting member 9, a member that is wholly formed of the nonconductive resin can be used, but it is preferable to use a member having a structure that a periphery of the shaft 9a of the bolt 12 of metal is covered with the insulation layer 13 in terms of strength. Namely, the connecting member 9 is formed so as to have a compromise structure between the bolt 12 of metal and the insulation layer 13 of the nonconductive resin so that the strength can be enhanced in comparison with a case that the whole of the connecting member 9 is formed of the nonconductive resin. As the nonconductive resin with which the bolt 12 of metal is coated, it is preferable to use a resin that has a linear coefficient of expansion close to that of the metal constituting the bolt 12 in order to prevent creep.

At the forward end of the shaft 9a of the connecting member 9, a first screw part 18 for being screwed to the first terminal housing 5 is formed. In addition, in the shaft 9a of the connecting member 9a, a second screw part 45 is formed, the second screw part 45 being formed for being screwed to a female screw 44 of the insulation member (particularly, in the embodiment, the second insulation member 8d) that is arranged in the forward end side of the connecting member 9 in the insertion direction of connecting member 9, and having a screw pitch larger than the first screw part 18.

In a periphery of the head 9b of the connecting member 9, a packing 14 for preventing water from entering into the first terminal housing 5 is installed. In addition, an elastic member 15 is installed between a lower surface of the head 9b of the connecting member 9 and an upper surface of the first insulation member 8a arranged directly below the head 9b, the elastic member 15 being used for applying a predetermined pressing force to the first insulation member 8a. The elastic member 15 is formed of, for example, a spring of metal such as SUS. Further, in embodiment, the elastic member 15 is positioned as a part of the connecting member 9.

In an upper surface of the first insulation member 8a with which the lower portion of the elastic member 15 contacts, a concave portion 16 covering (housing) the lower portion of the elastic member 15 is formed, and in a bottom portion of the concave portion 16 (namely, a seat portion with which the lower portion of the elastic member 15 contacts), a receiving member 17 of metal such as SUS is installed, the receiving member 17 being used for receiving the elastic member 15 and preventing the first insulation member 8a formed of the nonconductive resin from being damaged.

The receiving member 17 prevents the damage of the first insulation member 8a by dispersing stress applied to the upper surface of the first insulation member 8a from the elastic member 15. Consequently, it is preferable that a contact area of the receiving member 17 and the first insulation member 8a is formed so as to be as large as possible. In the embodiment, in order to increase the contact area of the receiving member 17 and the first insulation member 8a, the receiving member 17 having a shape that it contacts over the entire bottom surface of the concave portion 16 is installed.

The connecting member 9 is inserted into the first terminal housing 5 from the surface sides of the first connecting terminals 4a to 4c to which the first insulation members 8a to 8c are fixed (FIG. 4 shows as the upper surface sides), and presses them from the head 9b of the connecting member 9 to the forward end of the shaft 9a (FIG. 4 shows as from the upper portion to the lower portion) by that the first screw part 18 located at the forward end of the shaft 9a is screwed to a threaded screw hole 19 formed on the inner peripheral surface of the first terminal housing 5, and collectively fixes and electrically connects a plurality of the first connecting terminals 4a to 4c and a plurality of the second connecting terminals 6a to 6c at each contact.

As described above, the connecting member 9 is inserted into the first terminal housing 5 and then is fastened and fixed by that the first screw part 18 is screwed to the threaded screw hole 19, so that if the first screw part 18 has the same screw diameter that the second screw part 45 has, due to the fact that the first screw part 18 has a different screw pitch from the second screw part 45, the connecting member 9 can not be inserted into the first terminal housing 5 so as to pass through the first connecting terminals 4a to 4c and the insulation members 8a to 8d. Consequently, in the connector 1, the second screw part 45 is formed to have the screw diameter larger than the first screw part 18.

In addition, in the connector 1, the fastening work is carried out by rotating the connecting member 9, so that in order to prevent the second insulation member 8d from being rotated around the shaft 9a of the connecting member 9 in accordance with the rotation of the connecting member 9, the second insulation member 8d is installed so as to be able to move only in an axis direction of the connecting member 9. In the embodiment, the rotation of the second insulation member 8d is prevented by that the second insulation member 8d is formed so as to have a size that fits snugly the inside of the first terminal housing 5, or a housing space in the first terminal housing 5 is formed so as to have a size that fits snugly the second insulation member 8d. Further, the first insulation members 8a to 8c are integrally fixed to the first connecting terminals 4a to 4c held by the resin compact 10 and they are not be rotated in accordance with the rotation of the connecting member 9, so that any countermeasure is not needed.

The first terminal housing 5 is formed of a hollow tubular body 20 having a cross-section of nearly rectangular shape. An outer peripheral part in one end side (FIG. 4 shows as a right side) of the tubular body 20 fitted to the second terminal housing 7 is formed so as to have a taper shape, in view of the fitting capabilities to the second connector part 3. Also, in the outer peripheral part in one end side of the tubular body 20, a terminal housing waterproof structure 21 for sealing between the first connector part 2 and the second connector part 3 is formed. The terminal housing waterproof structure 21 includes a concave portion 22 formed in an outer peripheral part in an opening side of the tubular body 20 and a packing 23 such as an n=ring formed in the concave portion 22.

In another end side (FIG. 4 shows as a left side) of the tubular body 20, the resin compact 10 in which each of the first connecting terminals 4a to 4c is aligned and held is housed. In the outer peripheral part in another end side of the tubular body 20, a flange 24 (mounting holes are not shown) for fixing the first connector part 2 to a case body such as a device, for example, a shield case of motor is formed. In a peripheral edge part 25 of the flange 24 for inserting a bolt into the mounting holes and fixing to the case body such as a device, a packing or the like for sealing between the case body such as a device and the first connector part 2 can be installed. Further, the composition of the flange 24 is not base on the promise that the first connector part 2 is fixed to the case body such as a device, but the flange 24 can be installed in the second connector part 3 or it can be installed in both of the first connector part 2 and the second connector part 3. In addition, both of the first connector part 2 and the second connector part 3 can be free without being fixed to the case body such as a device.

In addition, the flange 24 is effective in enhancing radiation properties. Namely, due to forming the flange 24, the surface area of the first terminal housing 5 can be increased, and when heat generated in the first connector part 2 (for example, heat generated at each contact) is dissipated exteriorly via the first terminal housing 5, the radiation properties can be enhanced.

In the upper portion (FIG. 4 shows as the upper side) of the tubular body 20, a connecting member insertion hole 26 into which the connecting member 9 is inserted is formed. The connecting member insertion hole 26 is formed so as to have a tubular shape and the lower end portion (FIG. 4 shows as a lower side) of the tubular shape is folded interiorly. A peripheral edge part of a lower surface of the head 9b of the connecting member 9 contacts the folded part so that stroke of the connecting member 9 can be controlled.

It is preferable that the tubular body 20 is formed of metal such as aluminum having a high electric conductivity, a high heat conductivity and a light weight in view of shield performance, radiation properties and reduction in weight, but it can be formed of a resin or the like. In case that the first terminal housing 5 is formed of a nonconductive resin, the second insulation member 8d and the first terminal housing 5 can be integrally formed with the nonconductive resin. Further, in the embodiment, the tubular body 20 is formed of aluminum. As described above, the tubular body 20 is formed of aluminum so that an advantage that when the connecting member 9 is screwed to the threaded screw hole 19, it can be fastened more firmly in comparison with a case that the tubular body 20 is formed of an insulating resin can be obtained.

As shown in FIG. 6, the second connector part 3 includes a second terminal housing 7 in which a plurality of (three) second connecting terminals (female terminals) 6a to 6c are housed in alignment with each other. Further, here, a connector part having the female terminals is called as the second connector part 3. Namely, the second terminal housing 7 can be any of male (a male terminal housing) and female (a female terminal housing) as a terminal housing. Here, corresponding to the fact that the first terminal housing 5 is a male terminal housing, a case that the second terminal housing 7 is a female terminal housing is explained.

Cables 27a to 27c extending from an inverter side are connected to each of one end sides of the second connecting terminals 6a to 6c. Each of the cables 27a to 27c is electrically connected to each of the first connecting terminals 4a to 4c via the second connecting terminals 6a to 6c, so that electricity of voltage and/or current corresponding to each of the first connecting terminals 4a to 4c is transmitted. Each of the cables 27a to 27c includes a conducting body 28 and an insulating layer 29 formed on an outer periphery of the conducting body 28. In the embodiment, the conducting body 28 having a surface area of 20 square mm is used.

Each of the cables 27a to 27c is held by a cable holding member 30 having a multiple tubular shape, namely a shape that a plurality of tubes are connected to each other, so as to be located apart at certain intervals in alignment with each other. By the cable holding member 30, when the first connector part 2 and the second connector part 3 are fitted to each other, each of the second connecting terminals 6a to 6c is positioned and held so as to be located below each of the first connecting terminals 4a to 4c that faces each of the second connecting terminals 6a to 6c so as to form a pair with each other (namely, that is an object to be connected).

The cable holding member 30 is formed of a nonconductive resin or the like in order to insulate each of the second connecting terminals 6a to 6c from each other and prevent it from short-circuiting. By the cable holding member 30, even if each of the cables 27a to 27c connected to each of the second connecting terminals 6a to 6c is excellent in flexibility, each of the second connecting terminals 6a to 6c can be held at a predetermined position. Namely, in the embodiment, a cable excellent in flexibility can be used as the cables 27a to 27c, so that degree of freedom of wiring when the cables 27a to 27c are laid can be increased.

Further, the cable holding member 30 carries out the positioning of the second connecting terminals 6a to 6c so as to hold the second connecting terminals 6a to 6c at a predetermined position by holding the cables 27a to 27c, particularly by holding end portion sides of the cables 27a to 27c that are adjacent to second connecting terminals 6a to 6c, but the positioning of the second connecting terminals 6a to 6c can be also carried out by holding the cables 27a to 27c and simultaneously holding second connecting terminals 6a to 6c directly. In addition, a bonding terminal holding member that does not hold the cables 27a to 27c, but holds the second connecting terminals 6a to 6c directly can be also used instead of the cable holding member 30.

With regard to the cable holding member 30, in the case of carrying out the positioning by holding the cables 27a to 27c instead of holding the second connecting terminals 6a to 6c directly, namely in the case of the embodiment, the cables 27a to 27c is formed of an flexible material so that the forward end sides of the second connecting terminals 6a to 6c can be formed to have a bendability to the second terminal housing 7. Due to the above-mentioned composition, in the first connector part 2, the first connecting terminals 4a to 4c are deformed by the pressing of the connecting member 9 and even if positions of the parts into which the second connecting terminals 6a to 6c are inserted are somewhat changed, a flexible response can be ensured.

In addition, a braided shield 31 for enhancing a shield performance is wrapped around the parts of the cables 27a to 27c, that are pulled out of the second terminal housing 7. The braided shield 31 contacts a tubular shield body 41 described below and is electrically connected (has identical potentials (GND)) to the first terminal housing 5 via the tubular shield body 41. Further, the braided shield 31 is not shown in FIGS. 1 and 2 for the purpose of simplification.

Figure 8A:
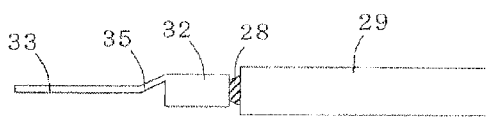
FIG. 8A is a side view schematically showing a second connecting terminal.
Figure 8B:
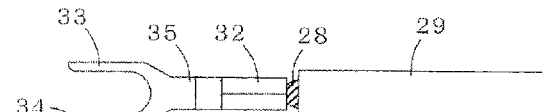
FIG. 8B is a bottom view schematically showing a second connecting terminal.

As shown in FIGS. 7 and 8, each of the second connecting terminals 6a to 6c includes a swaging part 32 for swaging the conductive body 28 exposed from the forward end parts of the cables 27a to 27c and a U-shaped contact 33 integrally formed with the swaging part 32. A tapered part 34 is formed in the forward end part of the U-shaped contact 33 for the purpose of enhancing insertion properties. When the first connector part 2 and the second connector part 3 are fitted to each other, the U-shaped contact 33 is inserted so as to sandwich the shaft 9a of the connecting member 9.

In the embodiment, in order to reduce the size of the connector 1, each of the cables 27a to 27c is formed so as to be aligned and held as tightly as possible. Consequently, as shown in FIG. 8, a body part 35 of the second connecting terminal 6b to be connected to the cable 27b that is arranged in the center at the alignment is bent, so that the second connecting terminals 6a to 6c can be arranged so as to be located apart at the same intervals.

It is preferable that each of the second connecting terminals 6a to 6c is formed of metal such as silver, copper, aluminum having a high electric conductivity for the purpose of reducing transmission loss at the connector 1 or the like. In addition, each of the second connecting terminals 6a to 6c has some flexibility.

Referring to FIG. 6 again, the second terminal housing 7 is formed of a hollow tubular body 36 having a cross-section of nearly rectangular shape. Since the first terminal housing 5 is fitted in the second terminal housing 7, an inner peripheral part in one end side (FIG. 6 shows as a left side) of the tubular body 36 fitted to the first terminal housing 5 is formed so as to have a taper shape, in view of the fitting capabilities to the first terminal housing 5.

Further, adversely, a composition that the second terminal housing 7 is fitted in the first terminal housing 5 can be also adopted. In this case, it is preferable that an inner peripheral part in one end side of the tubular body 20 constituting the first terminal housing 5 is formed so as to have a taper shape, an outer peripheral part in one end side of the tubular body 36 constituting the second terminal housing 7 is formed so as to have a taper shape, and the terminal housing waterproof structure 21 is formed on an outer peripheral part in one end side of the tubular body 36.

The cable holding member 30 for aligning and holding each of the cables 27a to 27c is housed in another end side (FIG. 6 shows as a right side) of the tubular body 36. A packingless air-tight part 37 is formed in a cable insertion side of the cable holding member 30 so as to prevent water from entering into the second terminal housing 7 through the cables 27a to 27c. A packing 38 that contacts the inner peripheral surface of the first terminal housing 5 is formed on the outer peripheral part of the cable holding member 30. Namely, the connector 1 is formed so as to have a double waterproof structure that includes the packing 23 of the terminal housing waterproof structure 21 and the packing 38 formed on the outer peripheral part of the cable holding member 30.

In addition to the above, the outer periphery of another side of the tubular body 36 out of which the cables 27a to 27c are pulled is covered with a rubber boot 39 so as to prevent water from entering into the tubular body 36. Further, the rubber boot 39 is not shown in FIGS. 1 and 2 for the purpose of simplification.

Further, a connecting member operation hole 40 is formed in the upper portion (FIG. 6 shows as an upper side) of the tubular body 36, the hole 40 being used for operating the connecting member 9 installed in the first connector part 2 when the second connector part 3 and the first connector part 2 are fitted to each other. The connecting member operation hole 40 also functions as a through hole for allowing the connecting member 9 to be inserted and removed into (from) the first terminal housing 5 after the first terminal housing 5 and the second terminal housing 7 are fitted to each other in addition to the above-mentioned function. Due to the function as the through hole, an assembly process of the connector 1 can be carried out easily.

It is preferable that the tubular body 36 is formed of metal such as aluminum having a high electric conductivity, a high heat conductivity and a light weight in view of shield performance, radiation properties and reduction in weight of the connector 1, but it can be formed of a resin or the like. In the embodiment, the tubular body 36 is formed of a nonconductive resin, consequently, a tubular shield body 41 formed of aluminum is installed on an inner peripheral surface of another end side of the tubular body 36.

The tubular shield body 41 has a contact part 42 for contacting an outer periphery of the first terminal housing 5 formed of aluminum when the first connector part 2 and the second connector part 3 are fitted to each other, and is thermally and electrically connected to the first terminal housing 5 via the contact part 42. Due to this, shield performance and radiation properties can be enhanced. In particular, with regard to radiation properties, remarkable improvement is expected due to transferring heat aggressively to a side of the first terminal housing 5 excellent in radiation properties.

Next, the connection between the first connecting terminals 4a to 4c and the second connecting terminals 6a to 6c by using the connector 1 according to the embodiment will be explained.

Figure 9:
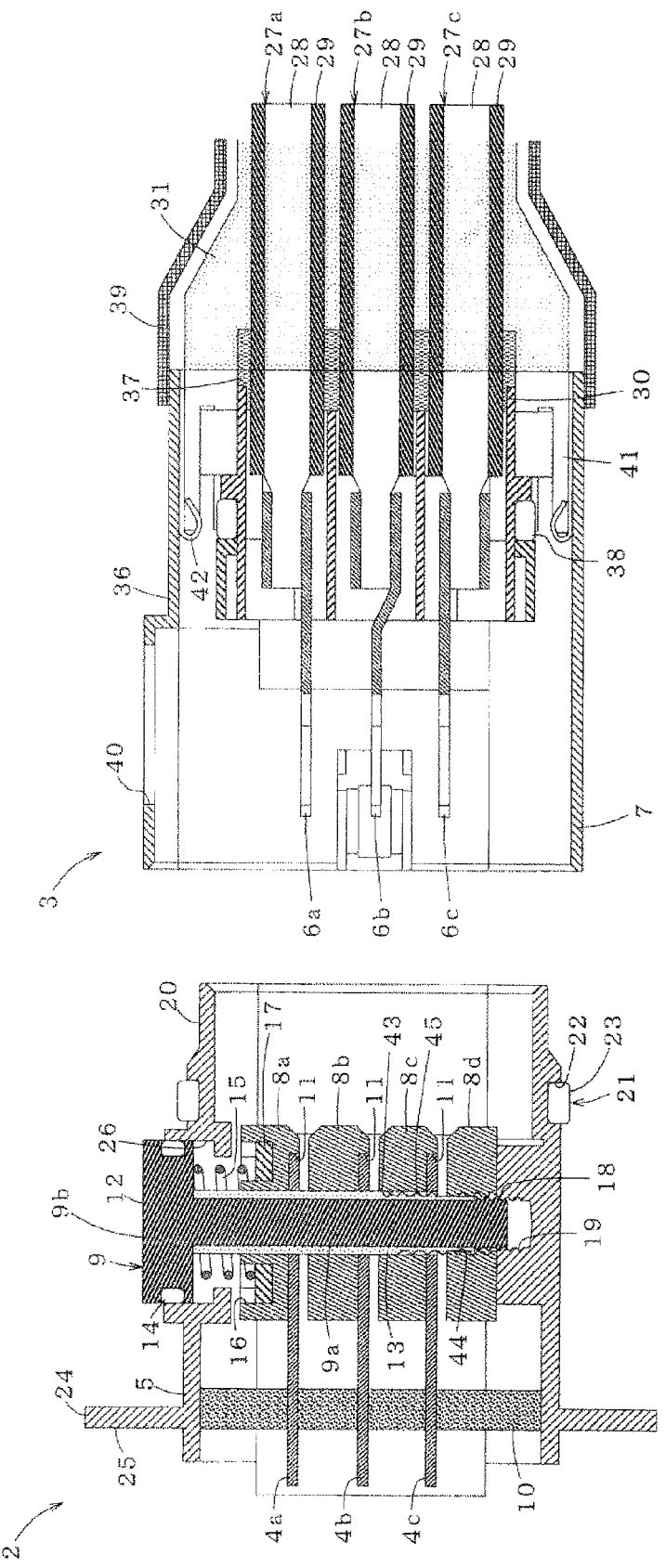
FIG. 9 is a perspective view schematically showing the connector before the first connector part and the second connector part are fitted to each other.

As shown in FIG. 9, when the first connector part 2 and the second connector part 3 are fitted to each other, each of the second connecting terminals 6a to 6c is inserted between each of the first connecting terminals 4a to 4c with which each of the second connecting terminals 6a to 6c forms a pair and each of the first insulation members 8a to 8c. And, due to the insertion, a stacked condition is formed, that each one surface of a plurality of the first connecting terminals 4a to 4c and each one surface of a plurality of the second connecting terminals 6a to 6c face each other so that they form a pair with each other, and the first connecting terminals 4a to 4c, the second connecting terminals 6a to 6c and the insulation members 8a to 8d are alternately arranged.

In this case, in the first connector part 2, each of the insulation members 8a to 8c is fixed to the forward end side of the first connecting terminals 4a to 4c that are held in alignment with each other so as to be located apart at certain intervals, so that intervals among the first insulation members 8a to 8c can be retained without separately installing a retention jig for retaining intervals among the first insulation members 8a to 8c. Due to this, each of the second connecting terminals 6a to 6c can be easily inserted between each of the first connecting terminals 4a to 4c with which each of the second connecting terminals 6a to 6c forms a pair and the insulation members 8a to 8d. Namely, insertion and removal properties of the second connecting terminals 6a to 6c are not be reduced. In addition, it is not necessary to install the retention jig for retaining intervals among the first insulation members 8a to 8c, so that it is extremely effective in view of being capable of realizing a further downsizing in comparison with a conventional technique.

In addition, the contact of the first connecting terminal 4a (or 4b) and the second connecting terminal 6a (or 6b) is sandwiched between the first insulation member 8a (or 8b) fixed to the first connecting terminal 4a (or 4b) constituting the contact and the first insulation member 8b (or 8c) fixed to the first connecting terminal 4b (or 4c) constituting the other contact. Similarly, the contact of the first connecting terminal 4c and the second connecting terminal 6c is sandwiched between the first insulation member 8c fixed to the first connecting terminal 4c constituting the contact and the second insulation member 8d fixed to the inner surface of the first terminal housing 5.

After that, as shown in FIG. 3, when the connecting member 9 is operated through the connecting member operation hole 40 and the first screw part 18 of the connecting member 9 is screwed to the threaded screw hole 19 of the first terminal housing 5 and is fastened, the connecting member 9 is pushed into a bottom portion of the threaded screw hole 19 while rotating and simultaneously the first insulation member 8a, first insulation member 8b, the first insulation member 8c and the second insulation member 8d are pressed by the elastic member 15 in this order. Due to this, each of the contacts is pressed so as to be sandwiched by any two of the insulation members 8a to 8d, each of the contacts is contacted in an insulated condition from each other, and each of the first connecting terminals 4a to 4c and each of the second connecting terminals 6a to 6c somewhat bend by the pressing of the insulation members 8a to 8d and contact each other in a wide area. Due to this, a connector particularly effective for vehicles in which vibration is easily generated can be realized.

In the case of the conventional technique as shown in JP-B-4037199, the contacts are pressed in accordance with the fastening of the bolt, so that pace of fastening the bolt is synchronized with a pace of pressing the contacts, and when a predetermined pressing force is tried to be acquired so as to fix the contacts firmly, a predetermined fastening distance, namely a stroke distance is needed.

Figure 10:
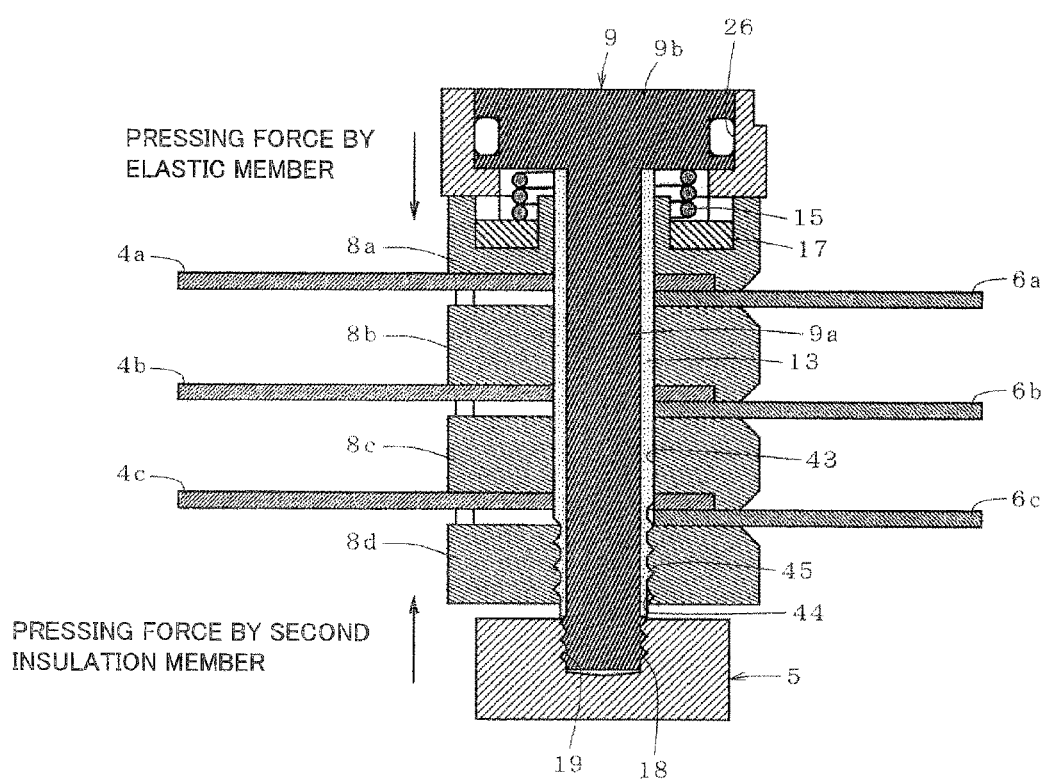
FIG. 10 is an enlarged explanatory view of the essential parts of the connection between the first connecting terminals and the second connecting terminals that uses the connector shown in FIG. 1.

On the other hand, in the connector 1 according to the embodiment, as shown in FIG. 10, the second screw part 45 to be screwed to a female screw 44 of the second insulation member 8d, the second screw part 45 having a screw pitch larger than the first screw part 18, is formed in the connecting member 9, so that at the same time when the connecting member 9 is fastened, the second insulation member 8d screwed to the second screw part 45 is fastened in a side of the head 9b at a pace faster than a pace of fastening the connecting member 9, and the first insulation members 8a to 8c are sequentially pressed so that the first insulation member 8a contacts the lower end portion folded of the connecting member insertion hole 26 formed in a tubular shape.

Namely, the connecting member 9 is fastened so that a pressing force due to the elastic member 15 and simultaneously a pressing force due to the second insulation member 8d are applied to the first insulation members 8a to 8c, and pressing forces in an opposite direction to each other are applied to the first insulation members 8a to 8c so as to hold the first insulation members 8a to 8c from opposite sides (FIG. 10 shows as upper and lower positions). Consequently, even if a stroke distance of the connecting member 9 is short, a predetermined pressing force for fixing the contacts firmly can be obtained. In addition, the number of rotations of the connecting member 9 until a predetermined pressing force is obtained can be reduced.

As mentioned above, the connector 1 of the embodiment is constructed such that it includes the first screw part 18 and the second screw part 45 having a larger screw pitch than the first screw part 18 and, when the first screw part 18 is screwed into the threaded screw hole 19 of the first terminal housing 5, a pressing force can be provided from two directions so as to sandwich each contact between the head 9b (i.e., the elastic member 15) of the connecting member 9 and the second insulation member 8d. Therefore, even when the stroke distance is shorter than before, a pressing force sufficient to fix the contacts can be obtained. Thus, the stroke distance of the connecting member 9 can be shortened and the dimension in the overlapping direction (i.e., in the stacking direction) can be thereby reduced, so that the connector 1 can be further downsized.

In addition, from the viewpoint of shortening the stroke distance of the connecting member 9, the stroke distance can be set to zero by adopting a composition that a bearing hole instead of the threaded screw hole 19 of the connecting member 9 is formed in the first terminal housing 5 without forming the first screw part 18 in the forward end of the connecting member 9 so that the connecting member 9 spins in the first terminal housing 5, but in this case, only the pressing force due to the second insulation member 8d is applied, so that a sufficient pressing force can not be obtained, differently from the above-mentioned embodiment.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

For example, in the embodiment, a power line of three-phase alternating current is assumed, but according to the technical idea of the invention, a composition that a plurality of power lines different from each other in applications such as a power line of three-phase alternating current used for a connection between a motor and an inverter, a power line of two-phase direct current used for an air conditioner in a connector for vehicles are collectively connected to each other can be also adopted. Due to this composition, power lines for a plurality of applications can be collectively connected to each other by one connector, so that it is not necessary to prepare different connectors for the respective applications and it can contribute to space saving and cost reduction.

In addition, in the embodiment, each of the first connecting terminals 4a to 4c and each of the second connecting terminals 6a to 6c contact to each other so as to be in surface contact with each other, but a composition that convex portions are formed in each surface of the first connecting terminals 4a to 4c that is a surface located at a side of the contacts and contacts each of the second connecting terminals 6a to 6c, and the U-shaped contacts 33 of the second connecting terminals 6a to 6 are fitted to the convex portions can be also adopted. Due to this composition, a bonding force between each of the first connecting terminals 4a to 4c and each of the second connecting terminals 6a to 6c can be further stabilized. Namely, this composition is particularly effective in vibration perpendicular to the connecting member 9.

In addition, a composition that terminal surfaces of each of the first connecting terminals 4a to 4c and each of the second connecting terminals 6a to 6c are roughened by a knurling process or the like so as to increase a friction force and allow the terminals to hardly move with respect to each other, so that the fixing at each contact can be strengthened can be also adopted.

In addition, in the embodiment, the U-shaped contacts 33 of the second connecting terminals 6a to 6 are formed so as to respectively have a forward end part that is branched to two parts having a length equal to each other, but a J-shaped contact in which one of the two parts is formed so as to be longer than another can be also used. By forming the contacts so as to have the J-shape, the second connector part 3 can be inserted into the shaft 9a of the connecting member 9, even if it is inserted from an oblique direction to longitudinal direction of the cable.

In addition, in the embodiment, a composition that each of the first connecting terminals 4a to 4c and each of the second connecting terminals 6a to 6c are contacted in a linear shape is adopted, when viewed from a side of the head 9b of the connecting member 9, but the first terminal housing 5 and the second terminal housing 7 can be formed so as to have a composition that each of the first connecting terminals 4a to 4c of the first connector part 2 intersects at a right angle and contacts each of the second connecting terminals 6a to 6c of the second connector part 3, when viewed from a side of the head 9b of the connecting member 9. Namely, the first connector part 2 and the second connector part 3 can be fitted to each other in the L-shape. Similarly, a composition that the second terminal housing 7 and the second connecting terminals 6a to 6c are located at an oblique position to the first terminal housing 5 and the first connecting terminals 4a to 4c can be also adopted. The basic teaching of the invention is applied as described above, so that an insertion and removal direction of the second connector part 3 into (from) the first connector part 2 can be diversified. In short, a pull-out direction of the cable from the connector can be adjusted in a desired direction, so that it can contribute to space-saving.

In addition, in the embodiment, a case that nothing is connected to one end sides of the first connecting terminals 4a to 4c, different from the case of the second connecting terminals 6a to 6c is explained, but not limited to this composition. Namely, the connector according to the invention can be used in a case that the cables are connected to each other.

In addition, in the embodiment, a cable excellent in flexibility is used as the cables 27a to 27c, but a cable that is rigid can be also used.

In addition, in the embodiment, the threaded screw hole 19 is formed in a side of the first terminal housing 5, but a composition that only a through hole is formed instead of the threaded screw hole 19 in the side of the first terminal housing 5, and the threaded screw hole 19 can be formed in a side of the second terminal housing 7 can be also adopted. And, the threaded screw hole 19 can be also formed in both sides of the first terminal housing 5 and the second terminal housing 7.

Also, in the embodiment, the threaded screw hole 19 is formed at a location where the threaded screw hole 19 is screwed to the first screw part 18 of the forward end side of the connecting member 9, but a composition that the first screw part 18 is formed in a side of the head 9b of the connecting member 9 and the threaded screw hole 19 is formed so as to be screwed to the first screw part 18 formed in the side of the head 9b can be also adopted.

In addition, in the embodiment, the bolt 12 is explained as an example of the connecting member 9, but it is not intended that the composition of the connecting member 9 is limited to a bolt shape, for example, a composition that a shaft of a connector position assurance (CPA) lever for fixing the fitting between the first connector part 2 and the second connector part 3 is formed as the connecting member 9 and the fitting is fixed by rotating the CPA lever and simultaneously the connecting member 9 is pressed (or fastened) from the head 9b to the forward end of the shaft 9a of the connecting member 9 can be also adopted.

In addition, in the embodiment, a composition that a concave portion to which a hexagon wrench (also called as a hexagon socket screw key) fits is formed on an upper surface of the head 9b of the bolt 12 as the connecting member 9 is used, and this is based on assuming that a commercially available hexagon wrench is used, but assuming that a specialized tool not commercially available is used, a composition that a concave portion that has a shape corresponding to the specialized tool is formed on the upper surface of the head 9b of the bolt 12 as the connecting member 9 can be also adopted.

In addition, in the embodiment, with regard to a disposition of the connector in use situation, the connecting member 9 can be disposed to any of nearly horizontal situation and nearly perpendicular situation. Namely, the disposition in use situation is not included in use conditions to be required for the connector according to the invention.

In addition, in the embodiment, the first insulation member 8a adjacent to the head 9b is pressed by the head 9b of the connecting member 9 via the elastic member 15 constituting a part of the connecting member 9, but a composition that the first insulation member 8a adjacent to the head 9b is directly pressed by the head 9b not through the elastic member 15 can be also adopted.

What is claimed is:

1. A connector, comprising:
    a first terminal housing with a plurality of first connecting terminals aligned and accommodated therein;
    a second terminal housing with a plurality of second connecting terminals aligned and accommodated therein;
    a plurality of insulation members aligned and accommodated in the first terminal housing, wherein when the first terminal housing and the second terminal housing are fitted to each other, the plurality of first connecting terminals and the plurality of second connecting terminals face each other to form pairs, respectively, and a stacked state is exhibited such that pairs of the first connecting terminals and the second connecting terminals are alternately interleaved with the plurality of insulation members;
    a connecting member comprising a head and a shaft connected to the head, the shaft penetrating contacts between the plurality of first connecting terminals and the plurality of second connecting terminals and the plurality of insulation members, the head pressing an adjacent insulation member, to thereby collectively fix the plurality of first connecting terminals and the plurality of second connecting terminals at the contacts for electrical connections therebetween, at least a portion of the connecting member, which penetrates the contacts, being comprised of a nonconductive material;
    wherein the shaft and/or the head comprises a first screw part to screw the connecting member into the first terminal housing and/or the second terminal housing,
    the shaft comprises a second screw part to screw into an insulation member of the plurality of the insulation members at a forward end in an insertion direction of the connecting member, the second screw part comprising a screw pitch greater than the first screw part, and
    when the first terminal housing and the second terminal housing are fitted to each other and then tightened by the first screw part of the connecting member and the insulation member screwed into by the second screw part is tightened toward the head by the second screw part, the plurality of first connecting terminals and the plurality of the second connecting terminals are collectively fixed and electrically connected at the contact.

2. The connector according to claim 1, wherein the second screw part comprises a screw diameter greater than the first screw part.

3. The connector according to claim 1, wherein the insulation member screwed into by the shaft is formed so as not to rotate around the shaft when the connecting member rotates, and
    the other insulation members except the insulation member screwed into by the shaft are each integrally fixed to the first connecting terminals adjacent thereto.

4. The connector according to claim 1, further comprising:
    an elastic member disposed between the head and the insulation member directly under the head.

* * * * *

UNITED STATES PATENT AND TRADEMARK OFFICE
CERTIFICATE OF CORRECTION

| | | |
|---|---|---|
| PATENT NO. | : 7,959,470 B1 | Page 1 of 1 |
| APPLICATION NO. | : 12/857964 | |
| DATED | : June 14, 2011 | |
| INVENTOR(S) | : Jun Umetsu et al. | |

It is certified that error appears in the above-identified patent and that said Letters Patent is hereby corrected as shown below:

Title page item (54) and col. 1, title should read as follows:

CONNECTOR WITH A CONNECTING MEMBER WITH A SCREW PORTION PENETRATING THE INSULATORS AND TERMINALS OF TWO MATING TERMINAL HOUSINGS

Signed and Sealed this
Eighteenth Day of October, 2011

David J. Kappos
*Director of the United States Patent and Trademark Office*